March 17, 1936.
J. BRADY
2,034,325
ANIMATED FIGURE
Original Filed Dec. 16, 1933
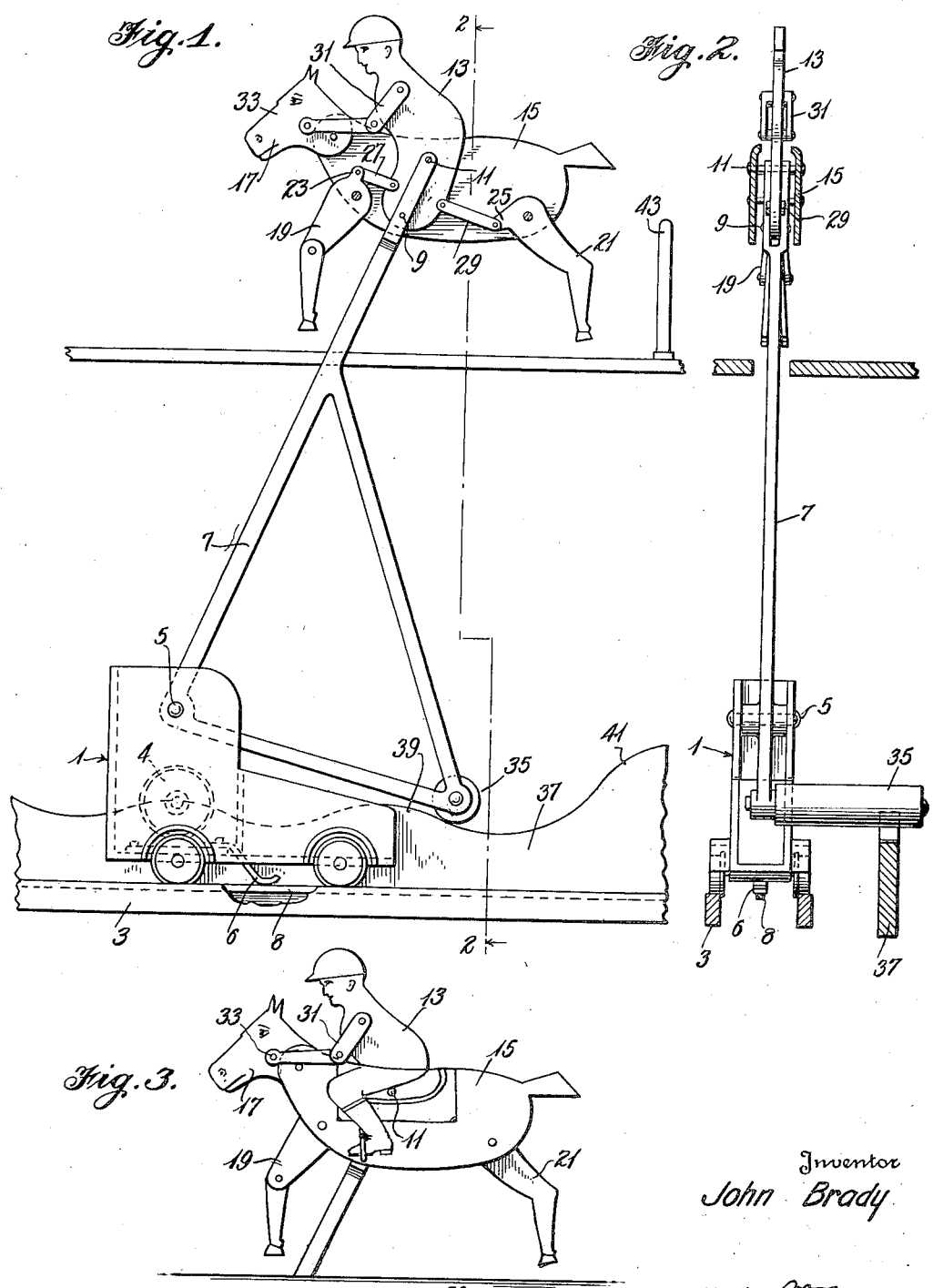
Inventor
John Brady
By Knight Bros
His Attorneys Patented Mar. 17, 1936

2,034,325

UNITED STATES PATENT OFFICE 2,034,325

ANIMATED FIGURE

John Brady, Baltimore, Md.

Original application December 16, 1933, Serial No. 702,784. Divided and this application November 19, 1934, Serial No. 753,770

7 Claims. (Cl. 46—127)

This application is a division of my co-pending application Serial No. 702,784, filed December 16, 1933.

My invention relates to animated figures, and particularly to means for supporting the figures and causing them to execute naturalistic motions.

The principal object of the invention is to mount a figure upon a support in such a way that angular motion of the support causes motions of parts of the figure with respect to each other. Thus in the case of a horse and rider, the rider can be made to move on the horse by simply rocking the support. The horse's extremities may be pivoted to its body and connected to the rider, so that relative motion of the rider and horse causes the horse's extremities to move in simulation of running or galloping.

The above-mentioned result may be accomplished by fixing to the support one of the main parts of the figure, such as the rider, in the case of a horse and rider, and balancing the other parts upon a pivotal connection with the first part.

One form of the invention is shown in the drawing by way of example. In the drawing, Fig. 1 shows a side elevation of a horse and rider with support, the near side of the horse being removed, Fig. 2 shows a vertical section on the line 2—2 of Fig. 1, and Fig. 3 shows a side elevation of the horse and rider without the supporting truck.

I have selected for illustration of the invention a figure simulating a horse and rider. The figure may be mounted upon any suitable form of carrier, such as a truck 1 riding upon a track 3 and driven by an electric motor 4 supplied with current through a brush 6 sliding upon a third rail 8. The truck 1 carries by a pivot 5 a triangular frame 7, upon the upper end of which the figure is mounted. In this case, the forked upper end of the frame 7 is fixed by a rivet 9 and a pin 11 to the body 13 of the rider. The rider is positioned between two halves 15 representing the body of the horse. The pin 11 extends through the horse's body pieces 15 as well as through the body 13 of the rider and serves as a pivotal connection between the horse and rider. The rivet 9 terminates inside the halves 15 of the horse's body. There are also extremities pivoted to the horse's body, namely a head 17, front legs 19, and hind legs 21. The legs 19 and 21 have projecting fingers 23, 25 to which are pivotally connected links 27 and 29 pivoted at their opposite ends to the body 13 of the rider. The rider has arms 31 pivotally connected at the hands 33 to the horse's head 17. The connections between the links 27 and 29 and the arms 31 and the horse's extremities are arranged in such a way that when the rider's body rocks about pivot 11 with respect to the horse's body, the extremities of the horse will be moved to simulate a gallop.

The center of gravity of the horse lies under the pivot 11, wherefore the horse retains a horizontal position when the rider rocks. The rider is rocked by motion of its triangular supporting frame 7, which carries at its rear corner a roller 35 riding upon an undulating cam 37. The cam 37 has relatively small humps 39 to impart movement to the horse simulating a normal gait, and relatively large humps 41 under hurdles 43, to make the horse jump.

The device operates in the following manner: As the electrically driven truck 1 travels along the track 3 the roller 35 rides upon the undulating cam 37. This causes the frame 7 to rock upon pivot 5, thus imparting an angular movement to the rider 13. Horse and rider being not directly over the pivot 5, there is also imparted to them an up and down movement simulating that of a galloping horse. While the rider executes an angular motion the horse's body retains a horizontal position, due to its being balanced upon the pivot 11. The relative motion between horse and rider causes motions of the extremities of the horse, due to the linkages between the extremities and the rider's body.

The horse and rider shown are merely representative of many different animated figures which can be supported and operated in the manner described.

Having described my invention,

What I claim is:

1. In a device of the class described, a figure comprising two bodies pivoted together, a rocking frame to which one of said bodies is fixed, said other body having extremities movably connected thereto and being balanced upon its pivotal connection with said first body, and connections between said extremities and said first body, whereby as said first body rocks with said rocking frame and said other body retains its balance said extremities are moved with respect to said other body.

2. In a device of the class described, a figure comprising a rider and mount pivoted together, said mount having extremities pivoted thereto and connected to said rider, and a support for said figure comprising a rocking frame fixed to said rider, said mount being freely balanced upon its pivotal connection with said rider.

3. In a device of the class described, a carrier, a frame pivoted on said carrier, a figure simulating a horse and rider, the rider being fixed to said frame, the horse being pivotally suspended from said rider, the horse having its extremities pivoted to its body, means connecting said extremities to said rider, and means for rocking said frame as said carrier travels, whereby said rider is rocked with respect to said horse and imparts motions to said extremities through said connections.

4. In a device of the class described, a carrier, a level surface for said carrier to ride upon, an elongated undulating cam extending along said surface, a figure pivotally supported on said carrier, and means connected with said figure and normally riding on said cam as said carrier travels for rocking said figure about its pivot.

5. An animated figure comprising two parts pivotally connected, a support fastened to one of said parts, the other part being balanced on said pivotal connection, a movable carrier on which said support is rockably mounted, the center about which said support rocks being displaced from the vertical line running through said pivotal connection, whereby rocking of said support causes up and down movements of said figure accompanied by relative angular movement of its parts about said pivotal connection.

6. A device as described in claim 5, in combination with an undulating cam extending in a generally horizontal direction; said support having a follower adapted to travel upon said cam as said carrier moves, to rock said support.

7. An animated figure comprising a mount and rider pivotally connected; a support to which said rider is fastened, said mount being balanced upon said pivotal connection; a movable carrier upon which said support is rockably mounted, the center about which said support rocks being displaced from the vertical line through said pivotal connection; an elongated cam disposed in a generally horizontal direction; said support having a follower adapted to travel upon said cam as said carrier moves; said cam having relatively small humps to cause said figure to execute small up and down movements simulating a normal gait, and relatively large humps to cause said figure to jump.

JOHN BRADY.